United States Patent
Albright et al.

(10) Patent No.: US 8,161,894 B1
(45) Date of Patent: Apr. 24, 2012

(54) FERTILIZER APPLICATOR ASSEMBLY

(75) Inventors: Stephen B. Albright, Inman, KS (US); Mike J. Bergmeier, Hutchinson, KS (US); Delmar D. Edmisson, Blackwell, OK (US)

(73) Assignee: Shield Industries, Inc., Hutchinson, KS (US)

( * ) Notice: Subject to any disclaimer, the term of this patent is extended or adjusted under 35 U.S.C. 154(b) by 51 days.

(21) Appl. No.: 12/584,915

(22) Filed: Sep. 15, 2009

Related U.S. Application Data

(60) Provisional application No. 61/192,191, filed on Sep. 15, 2008.

(51) Int. Cl.
*A01C 23/00* (2006.01)
(52) U.S. Cl. .......................................... 111/123
(58) Field of Classification Search ................... 172/681, 172/684.5, 685, 690, 699–701, 705–711, 172/713, 719, 721–733, 747, 749, 762–776; 111/118–120, 123–126
See application file for complete search history.

(56) References Cited

U.S. PATENT DOCUMENTS

| | | | |
|---|---|---|---|
| 2,148,925 A | 2/1939 | Bochy |
| 2,598,121 A | 5/1952 | Hannibal |
| 2,619,054 A | 11/1952 | Bell |
| 2,684,617 A | 7/1954 | Johnston |
| 2,689,514 A | 9/1954 | Ferguson |
| 2,716,823 A | 9/1955 | Mullin |
| 2,734,439 A | 2/1956 | Padrick |
| 2,768,591 A | 10/1956 | James |
| 2,842,077 A | 7/1958 | Morrison |
| 2,849,969 A | 9/1958 | Taylor |
| 2,874,656 A | 2/1959 | Bennett |
| 2,904,119 A | 9/1959 | Hunter |
| 2,924,187 A | 2/1960 | Zimmerman |
| 3,002,574 A | 10/1961 | Padrick |
| 3,092,052 A | 6/1963 | Anderson |
| 3,177,830 A | 4/1965 | Zimmerman |
| 3,188,988 A | 6/1965 | Peck |
| 3,259,087 A | 7/1966 | Horton |
| 3,289,772 A | 12/1966 | Blackwood |
| 3,296,985 A | 1/1967 | Shelton |
| 3,517,752 A | 6/1970 | Glee |
| 3,618,538 A | 11/1971 | Brannan |
| 3,919,951 A | 11/1975 | Williams |
| 3,970,445 A | 7/1976 | Gale et al. |
| 4,033,271 A | 7/1977 | Williams et al. |
| 4,132,181 A | 1/1979 | Smith |
| 4,201,142 A | 5/1980 | Stump |
| 4,269,274 A | 5/1981 | Robertson et al. |
| 4,333,536 A | 6/1982 | Ryan |
| 4,355,589 A | 10/1982 | Wetmore |
| 4,446,927 A | 5/1984 | Robertson |
| 4,592,294 A | 6/1986 | Dietrich et al. |

(Continued)

FOREIGN PATENT DOCUMENTS

AU 217205 3/1957

(Continued)

*Primary Examiner* — Christopher J. Novosad

(57) ABSTRACT

An improved fertilizer knife assembly includes a shank member for attaching to the bracket piece of a fertilizer implement, a point member and a fertilizer tube. The point member is removably mounted to the shank member and includes a chisel like leading edge and opposite generally flat flank portions. The flank portion presents a pattern of crumbler ridges. The leading edge and the crumbler ridges break and crumble the soil into small clumps so that the fertilizer knife assembly leaves a narrow furrow filled with crumbled soil so that the fertilizer tube may deposit fertilizer which is trapped at the bottom of the furrow as the improved fertilizer knife assembly drafts through soil.

12 Claims, 4 Drawing Sheets

U.S. PATENT DOCUMENTS

| | | | |
|---|---|---|---|
| 4,616,580 | A | 10/1986 | Moore et al. |
| 4,628,839 | A | 12/1986 | Edmisson |
| 4,638,748 | A | 1/1987 | Kopecky |
| 4,719,862 | A | 1/1988 | Edmisson |
| 4,773,340 | A | 9/1988 | Williams et al. |
| 4,834,189 | A | 5/1989 | Peterson et al. |
| 4,869,328 | A | 9/1989 | Carroll |
| 5,310,009 | A | 5/1994 | Rowlet |
| 5,314,029 | A | 5/1994 | Rowlett |
| 5,452,673 | A | 9/1995 | Bruce |
| 5,787,994 | A | 8/1998 | Friesen |
| 6,167,821 | B1 | 1/2001 | Beggs |
| 6,318,279 | B1 | 11/2001 | Rowlet et al. |
| 6,382,114 | B1 | 5/2002 | Lanpher |
| 6,397,767 | B1 | 6/2002 | Dietrich, Sr. |
| 6,405,665 | B1 | 6/2002 | Henry et al. |
| 6,745,709 | B2 | 6/2004 | Rowlett et al. |
| 6,871,709 | B2 | 3/2005 | Knobloch et al. |
| 6,955,131 | B2 | 10/2005 | Beaujot et al. |
| 6,973,884 | B2 | 12/2005 | Dietrich, Sr. |
| 7,568,439 | B2 | 8/2009 | Steinlage et al. |

FOREIGN PATENT DOCUMENTS

| | | |
|---|---|---|
| CA | 496012 | 9/1953 |
| CA | 945183 | 4/1974 |
| DE | 552793 | 11/1930 |
| DE | 35151 | 1/1965 |
| FR | 657738 | 5/1929 |
| FR | 904577 | 11/1945 |
| GB | 677874 | 8/1952 |
| GB | 1141320 | 1/1969 |
| NL | 7409495 | 7/1974 |

FERTILIZER APPLICATOR ASSEMBLY

CROSS REFERENCES TO RELATED APPLICATIONS

This application claims the benefit of U.S. provisional patent application No. 61/192,191 filed Sep. 15, 2008 which is incorporated herein by reference.

FIELD OF THE INVENTION

This invention relates to an improved fertilizer applicator assembly used to apply fertilizer beneath the soil surface, and more particularly, to an improved applicator knife assembly which releases a stream of fluid fertilizer, such as anhydrous ammonia, at the bottom of a furrow which is formed by the passage of the applicator knife assembly through the soil.

BACKGROUND OF THE INVENTION

Fertilizer blade assemblies are employed by farmers to deliver nitrogen enriching fertilizers such as anhydrous ammonia to a targeted zone beneath the surface of the soil of a crop field while causing a minimum of disruption to the structure of the upper layer of the top soil. Fertilizer blade assemblies are often used by farmers who are practicing "low till" agriculture. Low till agriculture is a method of farming in which the disturbance of the soil is kept to a minimum. By preserving the structure of the upper layer of top soil, farmers can protect the moisture retaining capacity of the soil and also make it easier for new crop plants to put down roots. Typically, fertilizer implements carry patterns of fertilizer blade assemblies spaced for simultaneously delivering fertilizer to a plurality of parallel furrows.

Prior art fertilizer applicator blades are typically one piece structures having a shank plate with a blade portion. The shank plate is typically an elongated steel plate which, when in use, slants down and forward into the soil and is usually bolted to one of a plurality of the bracket pieces of a fertilizer implement. A typical prior art blade portion is either integral with the shank plate or permanently welded to the shank plate and provides a hard sharp leading edge. A fertilizer tube is also welded to the trailing edge of the shank plate. The fertilizer tube terminates at the base of the shank plate and delivers liquid fertilizer to the furrowed soil at that location as the applicator blade assembly cuts through the soil. With prior art fertilizer applicator blades; when part of the fertilizer applicator blade is too worn for use, the entire blade is removed and replaced.

The design and function of a fertilizer blade presents a difficult challenge for designers. The cost of fuel for powering tractors which pull fertilizer implements has increased greatly in recent years. The cost of steel used for making replacements for worn fertilizer blades has also recently increased substantially. Since the early 1970's, as of the filing date of this application, the cost of anhydrous ammonia fertilizer has increased by approximately a factor of ten after correcting for inflation. Accordingly, what is needed is a fertilizer blade assembly which minimizes the waste and loss of fertilizer, which may be inexpensively reconditioned for use when worn, which minimizes the amount of energy required to pull the blade assembly through soil.

BRIEF DESCRIPTION OF THE INVENTION

The above described needs are addressed by an improved fertilizer blade assembly which includes an elongated shank member, a point member and a fertilizer tube. The shank member extends between a proximate end and a distal end. The proximate end of the shank member has provisions for attaching the shank member to a bracket piece of a fertilizer implement. When mounted and in use, the distal end of the shank member extends downward and to a lesser extent forward from the proximate end. The elongated shank member preferably has a generally constant rectangular cross section and presents a front surface, an opposite back surface and opposite side surfaces. The spacing between the front and back surfaces of the shank member is preferably substantially greater than the spacing between the side surfaces.

The point member is preferably fashioned from a hard cast iron material or an equivalent. The point member includes a forward leading edge portion, a base portion and opposite flank portions which connect between the leading edge portion and the base portion. The leading edge portion, the base portion and the flank portions of the point member define a channel which receives the shank member. The point member has at least one fastener hole which aligns with least one corresponding fastener hole in the shank member. A removable fastener common to the fastener holes in the shank member and the point member is used to removably fasten the point member to the shank member. The leading edge portion of the point member defined by two opposing generally symmetrically angled cutting surfaces which converge to present a chisel like leading edge. Preferably, the leading edge is generally parallel to the front surface of the shank member at the proximate end of the point member and diverges forward of the front surface of the shank member to a toe point at the distal end of the point member. The angle of the leading edge adjacent to the toe point relative to horizontal when the blade assembly is in use defines an attack angle relative to horizontal which is preferably between 40 degrees and 75 degrees. Each flank portion presents generally flat side surfaces which are generally parallel to and closely spaced away from the side surfaces of the shank member. The side surface of each flank portion originates at a forward boundary at one of the opposite cutting surfaces of the edge portion and terminates at a rear perimeter which extends from the proximate end of the point member to the distal end of the point member at the back end of the base portion.

A set of crumbler ridges project from the surface of each flank portion of the point member. Each of the crumbler ridges originates at a forward point near the leading edge portion and terminates at a rear point which is near the flank portion's rear perimeter. The distance between the forward and rear points defines the length of the crumbler ridge. The rear point is preferably elevated in relation to the forward point and the angle between the line connecting the forward and rear points and a horizontal line is the crumbler ridge angle. The crumbler ridges are spaced vertically on the flank portion's surface and are preferably arranged so that the rear point of each crumbler ridge is below the forward point of the next crumbler ridge. Also preferably, the crumbler ridges are arranged such that the crumbler ridge angle increases from the lowest crumbler ridge to the highest crumbler ridge. It is also preferable that crumbler ridges be generally square in profile and have height and width dimensions which are less than 10% of the length dimension. It is further preferable that the crumbler ridges present a convex arc shaped path between their forward and rear points which deviates from a straight line by generally less than 20% of the crumbler ridge length.

The fertilizer tube is spaced away from the rear surface of the shank member and is held in place by a bracket near the proximate end of the shank member and is held at its lower end by features near the bottom of the point member. The fertilizer tube includes at least one opening at the lower end of the fertilizer tube for releasing liquid fertilizer into the soil behind the lower end of the point member. The fertilizer tube is protected by the shank member and the point member but is spaced away from the shank member and the point member by an air space in order to reduce the transfer of heat from the point member and the shank member into the fertilizer tube. This prevents heat from being transferred into liquid anhydrous ammonia and further prevents the accumulation of ice on the point member and the shank member.

DETAILED DESCRIPTION

Figure 1:
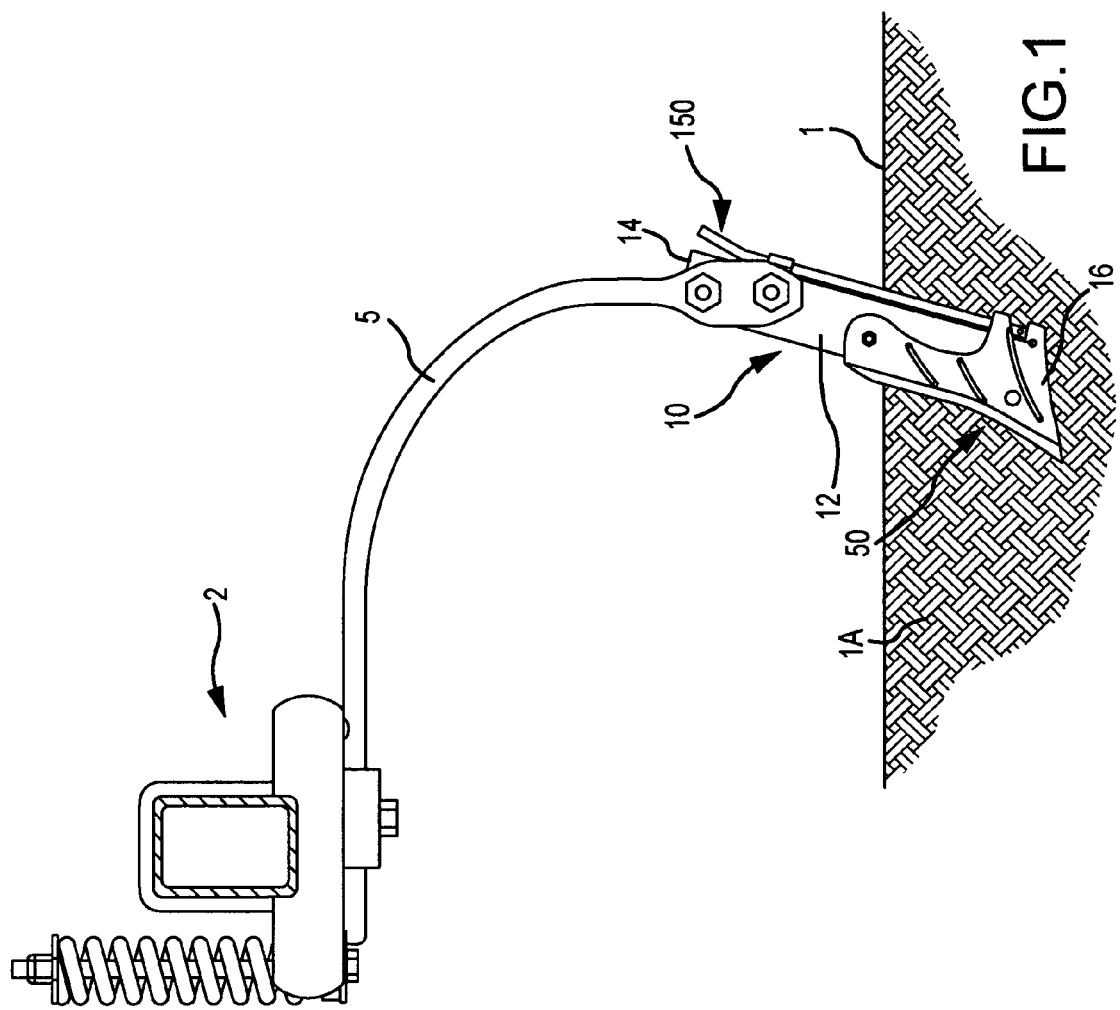
FIG. 1 is a side view of the fertilizer blade assembly mounted to a bracket piece of a fertilizer implement shown in a working position penetrating the surface of soil.

Referring to the drawings, FIG. 1 shows an improved fertilizer blade assembly 10 connected to a bracket piece 5 of a fertilizer implement 2. As can be seen in FIG. 1 fertilizer blade assembly 10 includes a shank member 12, a point member 50 and a fertilizer tube 150. It should be understood that bracket piece 5 is only one of a pattern of bracket pieces spaced to correspond with crop rows which are carried by fertilizer implement 2. In FIG. 1, fertilizer blade assembly 10 is shown in a working position in relation to the surface of soil 1 which is represented by a horizontal line. The skilled reader should understand that soil 1A is present everywhere below soil surface 1. Fertilizer blade assembly, when in operation, moves in a horizontal direction from right to left when viewed from the perspective of FIG. 1.

Fertilizer blade assembly 10 is intended for use for applying subsoil fertilizers, such as, for example, anhydrous ammonia. Fertilizer blade assembly 10 is further intended to deposit such a fertilizer in a zone four to seven inches beneath surface 1 shown in FIG. 1 in a conventional farming context where row crops are being planted and generally where crops are being rotated. Fertilizer blade assembly 10 is intended for use in depositing a fertilizer fluid such as anhydrous ammonia and is not generally intended to accomplish any other soil working objective aside from injecting fertilizer. Soil 1A as diagrammed in FIG. 1 presents an extreme oversimplification of farm-ground topsoil. Generally, soil 1A represents an upper layer of soil which is usually located above a compaction zone. This layer of soil is not a simple, homogeneous material but a complex aggregate of various materials having diverse mechanical properties. When farm-ground topsoil is sufficiently dry for cultivation, the soil of an upper layer such as soil 1A has mechanical properties which can be characterized as simultaneously receptive to forming or molding and yet also receptive to breaking or crumbling. Most soils, when in a normal range of moisture content suitable for cultivation, will respond, to varying degrees, to both these types of working processes. Soil may be formed or molded when the blade of a shovel slices through soil causing the soil to present a smooth formed surface. The same soil may also be crumbled into small clumps having rough surfaces. This happens when a gardener breaks and crumbles soil into small clumps by raking it with a bow rake (a type of rake having short stiff upright tines). Generally, prior art fertilizer knives for applying subsoil liquid fertilizer in a conventional farming context as described above are designed to slice through soil and form or mold the soil to close or fold together behind the fertilizer knife as it drafts through soil. As will be described in detail below, improved fertilizer knife 10 is adapted to exploit this second brittle property of the upper layer of soil 1A which allows it to shatter and crumble.

Figure 2:
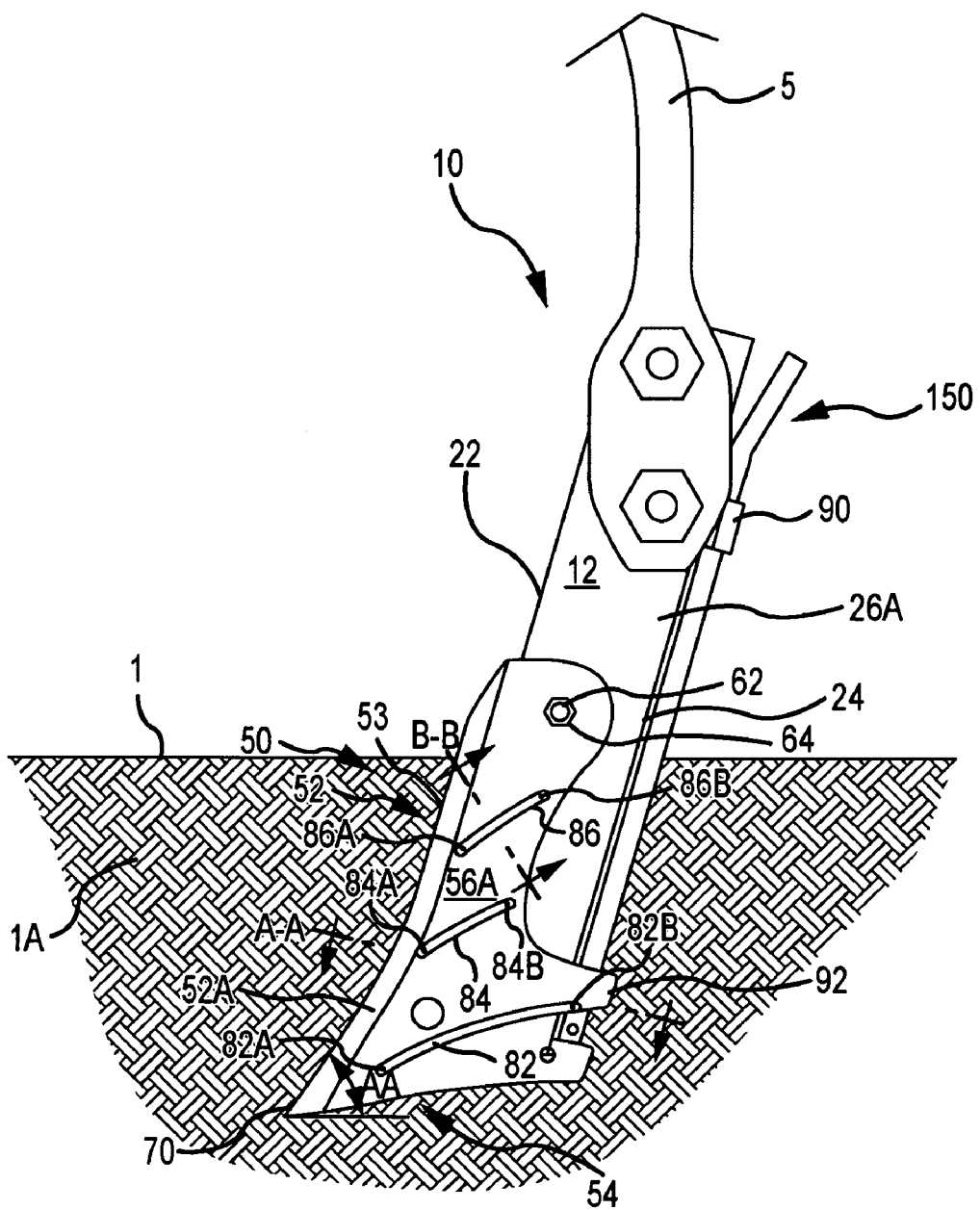
FIG. 2 is a side view of the fertilizer blade assembly.
Figure 4:
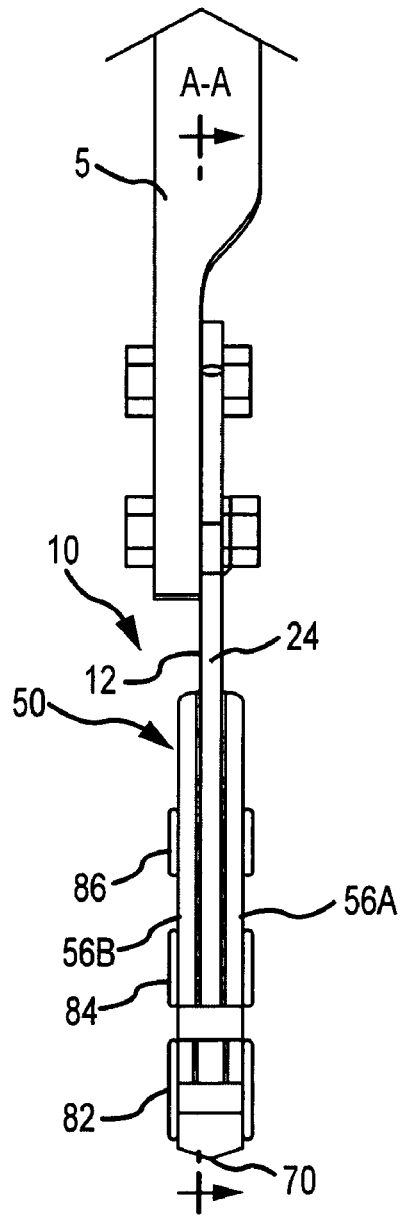
FIG. 4 is a rear view of the fertilizer blade assembly.
Figure 4A:
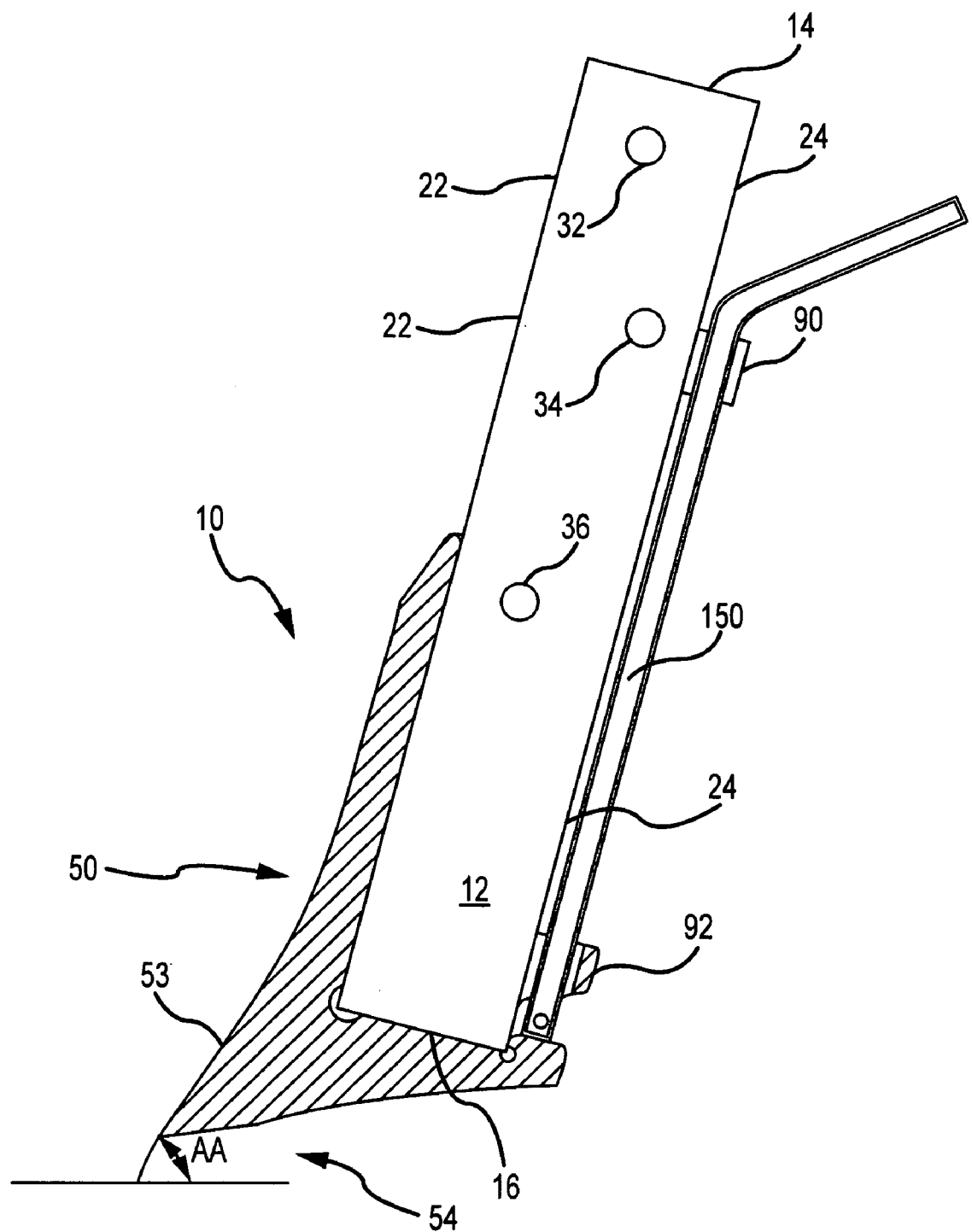
FIG. 4A is a section view of the fertilizer blade assembly taken from plane A-A of FIG. 4.

The purpose of shank member 12 is to carry point member 50 as point member 50 is drafted through the soil. Accordingly, shank member 12 transfers the loads resulting from drafting point member 50 through soil 1A to bracket piece 5. To function properly, shank member 12 should be strong and tough and therefore should be fashioned from a strong, tough material such as steel bar. As can be seen in FIG. 2, shank member 12 extends between a proximate end 14 and a distal end 16. When mounted and in use, shank member 12 is generally upright with its distal end 16 extending downward and to a lesser extent forward from proximate end 14. The elongated shank member 12 preferably has a generally constant rectangular cross section as can be best seen in FIG. 2A and presents a front surface 22 an opposite back surface 24 and opposite side surfaces 26A and 26B. The spacing between front and back surfaces 22 and 24 of shank member 12 is preferably significantly greater than the spacing between side surfaces 26A and 26B. Proximate end 14 of shank member 12 includes an upper attachment hole 32 and a lower attachment hole 34. As can be best seen in FIG. 4A, it is preferable to locate upper attachment hole 32 closer to front surface 22 and locate lower attachment hole 34 closer to back surface 34. This preferable arrangement of attachment holes 32 and 34 is advantageous because when fertilizer blade assembly is being pulled through soil 1A the loads transferred between shank member 12 and fasteners common to shank member 12 and bracket piece 5 and are directed from the rear side of upper fastener hole 32 and from the forward side of lower fastener hole 34. Accordingly, it is preferable for shank member 12 to have more material behind upper fastener hole 32 and a greater amount of material forward of fastener hole 34.

The purpose of point member 50 is to shatter and crumble the soil in a narrow zone in the top layer of soil and thereby leave in its wake a narrow strip of disrupted, crumbled soil which is approximately four to seven inches deep and approximately two inches wide. This strip of disrupted soil captures and substantially seals in fertilizer which is released at the lower back end of fertilizer knife assembly 10 through the distal end of fertilizer tube 150. Almost all of the abrading contact between soil 1A and fertilizer knife assembly 10 occurs between soil 1A and the outside surfaces of point member 50. Point member 50 transfers compressive forces to shank member 12 but is not subject to bending forces as is the case with shank member 12. Accordingly, point member 50 is preferably fashioned from a hard material, such as cast iron, which may be brittle and lack toughness when compared to the material of shank member 12.

Figure 2A:
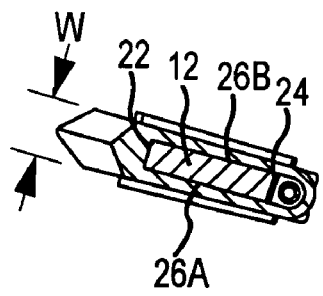
FIG. 2A is a section view of the fertilizer blade assembly taken from plane A-A of FIG. 2.
Figure 3:
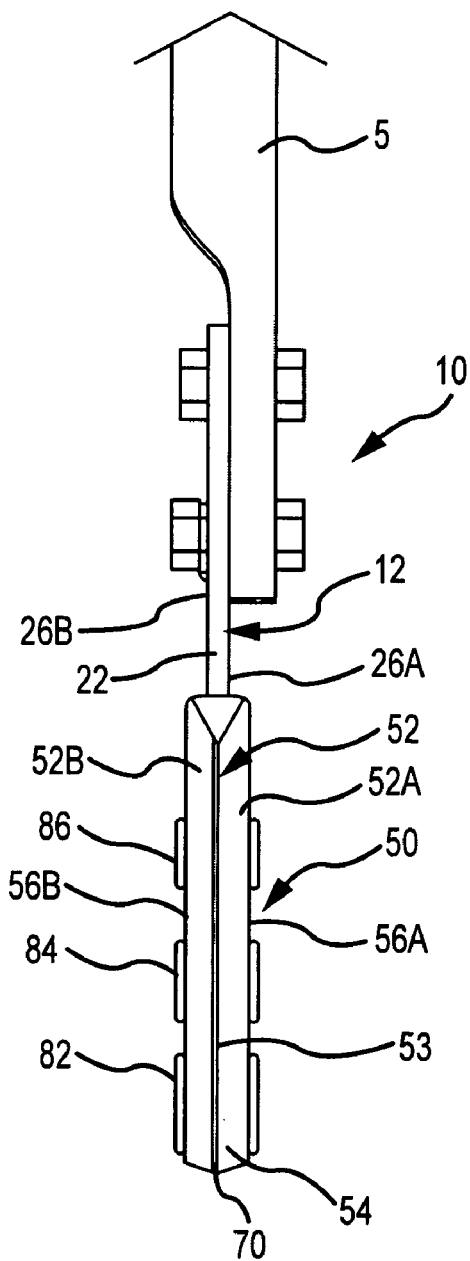
FIG. 3 is a front view of the fertilizer blade assembly.

Point member 50 includes a forward leading edge portion 52, a base portion 54 and opposite flank portions 56A and 56B which connect between the leading edge portion 52 and base portion 54. Leading edge portion 52, base portion 54 and the flank portions 56A and 56B of point member 50 define a channel 58 which receives shank member 12. Point member 50 has at least one mounting fastener hole 62 which aligns with least one corresponding fastener hole 36 in the shank member (shown in FIG. 4A). A removable fastener 64 common to the shank fastener hole 36 and mounting fastener hole 62 in point member 50 is used to removably fasten point member 50 to the shank member 12. Leading edge portion 52 is defined by two opposing generally symetrically angled cutting surfaces 52A and 52B which converge to present a chisel like leading edge 53 as is shown in FIGS. 2A and 3. In this example, leading edge 53 may be generally parallel to front surface 22 of shank member 12 at the proximate end of the point member 50 and preferably diverges forward of front surface 22 of shank member 12 to a toe point 70 at the distal end of point member 50. The angle of the leading edge 53 adjacent to the toe point 70 relative to a horizontal line when blade assembly 10 is in use defines an attack angle AA shown in FIG. 2 which, in this example, is preferably between 40 degrees and 75 degrees and, in this example, is approximately 55 degrees as shown in FIG. 2. Each flank portion 56A and 56B presents generally flat side surfaces which are generally parallel to and closely spaced away from the side surfaces of shank member 12. The surface of each flank portions 56A and 56B originates at a forward boundary at one of opposite cutting surfaces 52A and 52B of the edge portion and terminates at a rear perimeter which extends from the proximate end of the point member to the distal end of the point member at the back end of base portion 54. In this example, the spacing between the opposite outside surfaces of flank portions 56A and 56B, defines a width "W" dimension as shown in FIG. 2A and this width dimension W generally has a magnitude of no less than ⅞ inches and generally less than 1.5 inches and in this example is preferably about 1 inch.

As cutting surfaces 52A and 52B are forced through the soil as described above, the soil is wedged apart to form a narrow trench. The applicant's suspect in most cases, depending on soil conditions, the walls of this narrow trench might have a series of generally upright fractures resulting from the wedged apart soil faces traversing the corners defined between cutting surfaces 53A and 52B and the outside surfaces of flank portions 56A and 56B respectively, and, at least in some cases, depending again on soil conditions, the walls of the trench may even remain essentially in-tact. This in-tact condition of the trench walls might be the case were it not for a series of crumbler ridges 82, 84 and 86 which are arranged on the outside surfaces of flank portions 56A and 56B. The purpose of crumbler ridges 82, 84 and 86 is to disrupt the narrowly spaced trench walls and cause soil to slough off from the trench walls and crumble down into the trench where the crumbled soil covers and generally seals the fertilizer being delivered by fertilizer tube 150.

In this example, a pattern of three curved crumbler ridges 82, 84 and 86 project from the surface of each flank portion 56A and 56B. The skilled reader should understand that preferably, crumbler ridges 82, 84 and 86 are generally laterally symmetrical and are arranged as substantially identical sets of crumbler ridges on either side of point member 50. Crumbler ridges 82, 84 and 86 originate at forward points 82A, 84A and 86A respectively and terminate at a rear points 82B, 84B and 86B respectively. The distance between the forward and rear points defines the straight line length of each crumbler ridge. For each crumbler ridge, the rear point is preferably elevated in relation to the forward point. Thus, for example, rear point 82B is at a higher level than forward point 82A. The angle between a line passing through the forward point and the rear point and a horizontal line passing though point 70 may be defined as the crumbler ridge attack angle. Crumbler ridges 82, 84 and 86 are spaced vertically on the surface of flank portion 56A (or 56B) and are preferably arranged so that the rear point of each crumbler ridge is below the forward point of the next crumbler ridge. Accordingly, for example, rear point 82B of crumbler ridge 82 is positioned slightly below forward point 84A of crumbler ridge 84. Also preferably, crumbler ridges 82, 84 and 86 are arranged such that the crumbler ridge attack angle increases from the lowest crumbler ridge to the highest crumbler ridge. It is also preferable that crumbler ridges 82, 84 and 86 have a generally square and uniform cross section shape. Crumbler ridges 82, 84 and 86 may be characterized as having a height dimension which measures the spacing between the outside surface of a crumbler ridge and the surface of flank portion 56A. Crumbler ridges 82, 84 and 86 may also be characterized as having width dimension which gives the spacing between the upper and lower surfaces of the crumbler ridge. Thus, for crumbler ridges 82, 84 and 86 the height and width dimensions are generally similar in magnitude and preferably between 14% to 20% of the transverse width W dimension of point member 50 as shown in FIG. 2A (the W dimension also being understood as the distance between the outside surfaces of flank portions 56A and 56B and as noted above having a magnitude, in this example of less than one inch). Thus, crumbler ridges 82, 84 and 86, in this example, would have a width and height of approximately 0.20 inches. It is further preferable that crumbler ridges 82, 84 and 86 follow an arc shaped path between the forward point and the rear point of the crumbler ridge such that the center of curvature for crumbler ridges 84 and 86 is located below and generally behind the crumbler ridge and below and toward the back end of crumbler ridge 82. In each case, the crumbler ridge deviates from a straight line by preferably less than 20% of the crumbler ridge length.

Figure 2B:
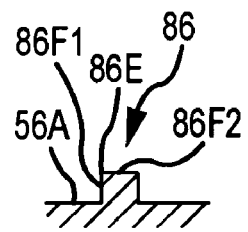
FIG. 2B is a section view of the fertilizer blade assembly taken from plane B-B of FIG. 2.

FIG. 2B is a cross section view taken from plane B-B of FIG. 2. FIG. 2B illustrates the cross section of crumbler ridge 86 and should be understood by the skilled reader as typical of the cross section of crumbler ridges 82 and 84 as well. In this example, FIG. 2B shows crumbler ridge 86 has a generally square cross section. In FIG. 2B, crumbler ridge 86 is shown to have a forward face 86F1 and an outside face 86F2. As is shown in FIG. 2B, forward face 86F1 and outside face 86F2 intersect to define a generally sharp forward edge 86E. Thus, crumbler ridge 86 is arranged to present a forward face 86F1 which is sloped, curved and normal to the outside surface of flank portion 56A and which also presents a sharp forward edge 86E as it cuts into the soil of the trench wall. The specific shape of crumbler ridge 86 as represented in FIG. 2B is less important than the presentation of a normal forward face and a sharp forward edge. By "normal forward face" the applicants intend that forward face 86F1 be generally normal to the outside surface of flank portion 56A as shown in FIG. 2B (even though it is curved along its length) and by "a sharp forward edge" the applicant's intend that forward face 86F1 and outside face 86F2 intersect at an angle which, when measured from the inside, is not substantially more than a right angle and is preferably either a right angle or an acute angle. The skilled reader should understand the geometry described here is typical of and applies to all six crumbler ridges shown in FIGS. 2-4.

The configuration of point member 50 described above, namely the configurations of leading edge portion 52, flank portions 56A and 56B and crumbler ridges 82, 84 and 86 are adapted to break soil 1A apart at leading edge 53 and then shatter and crumble the divided soil to produce a four to seven inch deep strip of crumbled soil trailing behind fertilizer knife assembly 10. This breaking and shattering action is accomplished because as soil 1A encounters point member 50, soil 1A, is first fractured about a vertical longitudinal plane by leading edge 53 as the soil splits into two sections which pass on either side of point member 50. As each section of soil passes over the abrupt transition between cutting surfaces 52A and 52B and flank portions 56A and 56B, it may be envisioned as fracturing into an series of upright, generally elongated clumps which tend to be oriented along the boundary between the cutting surface and the flank portion. These elongated clumps may be further envisioned as being crumbled or sloughed off by the crumbler ridges on the surfaces of the flank portions into short, small clumps. Thus, the soil is progressively broken by the features of point member 50 in different directions in order to transform soil 1A into crumbled soil. As point member 50 completes its passage through a section of soil 1A, it leaves in its wake a narrow furrow which is filled with small clumps of crumbled soil. This crumbled soil is preferable for receiving and trapping fertilizer deposited by fertilizer tube 150. In addition to the superior preparation of the soil, the energy required to draft fertilizer knife assembly 10 through soil 1A as it exploits the brittle characteristics of soil 1A by passage of the above described process may be generally less than the energy required to draft a prior art fertilizer knife which is typically designed to form and mold soil 1A to close a narrow slit behind a prior art fertilizer knife. Moreover, prior art fertilizer knives often have the disadvantage of possibly leaving a relatively deep slot between formed soil left after the passage of a prior art fertilizer knife. Such a slot can receive and trap row crop seeds at a soil depth which prevents germination. The crumbled soil in the furrow formed by improved fertilizer knife assembly 10 will not receive and trap seeds at a depth which prevents germination.

As can be understood from the above description, point member 50 may be removed and replaced when point member 50 is excessively worn. This capability to remove and replace point member 50 allows an operator to refurbish fertilizer knife assembly 10 while only discarding the limited amount of material comprising the point member. Moreover, it is also possible to vary the details of the geometry of point member 50 to adapt to different soil conditions. Because the point member may be removed and replaced, the operator can change a set of point members to adapt to a different soil condition at a different location. Thus the capability of removing and replacing point member 50 is an important advantage of improved fertilizer knife assembly 10.

Fertilizer tube 150 is spaced away from rear surface 24 of the shank member 12 and is held in place by a bracket 90 near the proximate end of the shank member and is held at its lower end by a channel feature 92. Fertilizer tube 150 includes at least one opening 152 at the lower end of the fertilizer tube for releasing liquid fertilizer into the soil behind the lower end of point member 50. Fertilizer tube 150 is protected by shank member 12 and point member 50 but is spaced away from shank member 12 and point member 50 by an air space 160 in order to reduce the transfer of heat from point member 50 and the shank member 12 into fertilizer tube 150. This is an important consideration because point member 50 experiences significant friction and abrasion as it passes through soil 1A. Fertilizer knives have been known to reach temperatures as high as 600 degrees F. during normal operations. Airspace 160 reduces the conduction of heat from shank member 12 into fertilizer tube 150 and then into the liquid fertilizer carried by fertilizer tube 150. Typically, the liquid fertilizer is liquid anhydrous ammonia which when heated can vaporize and when vaporizing can absorb enough heat to cause chunks of ice to form and adhere to a fertilizer knife. The object here is to convey the liquid fertilizer into the bottom of the furrow of crumbled soil trailing behind improved fertilizer knife assembly 10 prior to a transfer of heat into the liquid fertilizer sufficient to change its phase from a liquid to a gas. The spaced arrangement of fertilizer tube 150 also makes it possible to remove and replace fertilizer tube 150 which can be beneficial when different types of fertilizer are required. This further increases the versatility and effectiveness of improved fertilizer knife assembly 10.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A fertilizer blade assembly for injecting fertilizer fluid under the surface of agricultural topsoil, comprising:

(a) an elongated shank member that extends between a proximate end and a distal end, the proximate end adapted for attachment to a bracket piece of a fertilizer implement, the distal end extending downward and to a lesser extent forward from the proximate end, the elongated shank member having a generally constant rectangular cross section extending from its proximate end to its distal end and presenting a front surface, an opposite back surface and opposite side surfaces extending between the front and back surfaces such that the spacing between the front and back surfaces is substantially greater than the spacing between the side surfaces, the shank member further defining at least one fastener hole, (b) a point member including a forward leading edge portion, a base portion and opposite flank portions which connect between the leading edge portion and the base portion, the leading edge portion, the base portion and the flank portions defining a channel for receiving the shank member, the point member having at least one fastener hole which is positioned to align with the at least one fastener hole in the shank member for receiving at least one fastener for removably fastening the point member to the shank member, (c) the leading edge portion of the point member defined by two opposing generally symmetrically angled cutting surfaces which converge to present a leading edge, the leading edge being generally parallel to the front surface of the shank member at the proximate end of the point member and diverging forward of the front surface of the shank member at the distal end of the point member, (d) each flank portion of the point member having generally flat side surfaces which are generally parallel to and closely spaced away from the side surfaces of the shank member and which each originate at a forward boundary at one of the opposite cutting surfaces of the edge portion and terminate at a rear boundary which defines a rear perimeter that extends from the proximate end of the point member to the distal end of the point member, (e) each flank portion of the point member also presenting a plurality of crumbler ridges projecting from the outside surface of the flank portion, each crumbler ridge being generally rectangular in cross section, each crumbler ridge originating at a forward point adjacent to the flank portion's forward boundary and terminating at a rear point which is adjacent to the flank portion's rear boundary, such that the rear point is positioned above the forward point, the crumbler ridges spaced such that, for a crumbler ridge which is not the bottom crumbler ridge in the pattern, the forward point of the crumbler ridge is located at least as high as the rear point of the crumbler ridge which is located under the crumbler ridge, and, (f) a fertilizer tube mounted behind the shank member and extending to the distal end of the shank member having at least one opening at the distal end thereof for releasing fertilizer fluid, whereby, as the fertilizer knife assembly is drafted through a top layer of soil, the point member splits the soil and then crumbles the soil with the crumbler ridges to produce a furrow filled with crumbled small clumps of soil having a width substantially less than its depth, the crumbled soil capturing and retaining a substantial portion of the fertilizer fluid released from the fertilizer tube.

2. The fertilizer blade assembly of claim 1, wherein;

the crumbler ridges projecting from each flank portion include a pattern of at least three crumbler ridges, each crumbler ridge of each of the patterns of crumbler ridges projecting from the surface of the flank portion, each crumbler ridge originating at a forward point adjacent to the flank portion's forward boundary and terminating at a rear point which is adjacent to the flank portion's rear boundary, such that the rear point is elevated in relation to the forward point, the crumbler ridges of each pattern of crumbler ridges spaced such that, for a crumbler ridge which is not the bottom crumbler ridge in the pattern, the forward point of the crumbler ridge is located at least as high as the rear point of the crumbler ridge which is located under the crumbler ridge.

3. The fertilizer blade assembly of claim 1, wherein;

each crumbler ridge has at least a forward face and an outside face and the forward face is generally normal to the outside surface of the flank portion and the forward face and the outside face define a forward edge.

4. The fertilizer blade assembly of claim 1, wherein;

each crumbler ridge has at least a forward face and an outside face and the forward face is generally normal to the outside surface of the flank portion and the forward face and the outside face define a forward edge, and wherein each crumbler ridge has height and width dimensions which are generally between 10% and 25% the magnitude of the width of the point member.

5. The fertilizer blade assembly of claim 1, wherein;

the crumbler ridges projecting from each flank portion include a pattern of at least three crumbler ridges, each crumbler ridge of each of the patterns of crumbler ridges projecting from the surface of the flank portion, each crumbler ridge originating at a forward point adjacent to the flank portion's forward boundary and terminating at a rear point which is adjacent to the flank portion's rear boundary, such that the rear point is elevated in relation to the forward point, the crumbler ridges of each pattern of crumbler ridges spaced such that, for a crumbler ridge which is not the bottom crumbler ridge in the pattern, the forward point of the crumbler ridge is located at least as high as the rear point of the crumbler ridge which is located under the crumbler ridge, and wherein, a line passing through the forward point and the rear point of each crumbler ridge and a horizontal line define an attack angle for the crumbler ridge and the crumbler ridges are arranged such that the attack angle for each crumbler ridge in a pattern increases from the lowest crumbler ridge to the highest crumbler ridge.

6. The fertilizer blade assembly of claim 1, wherein;

the crumbler ridges projecting from each flank portion include a pattern of at least two crumbler ridges, each crumbler ridge of each of the patterns of crumbler ridges projecting from the surface of the flank portion, each crumbler ridge originating at a forward point adjacent to the flank portion's forward boundary and terminating at a rear point which is adjacent to the flank portion's rear boundary, such that the rear point is elevated in relation to the forward point, the crumbler ridges of each pattern of crumbler ridges spaced such that, for a crumbler ridge which is not the bottom crumbler ridge in the pattern, the forward point of the crumbler ridge is located at least as high as the rear point of the crumbler ridge which is located under the crumbler ridge, wherein, a line passing through the forward point and the rear point of each crumbler ridge and a horizontal line define an attack angle for the crumbler ridge and the crumbler ridges are arranged such that the attack angle for each crumbler ridge in a pattern increases from the lowest crumbler ridge to the highest crumbler ridge, and wherein, each crumbler ridge has at least a forward face and an outside face and the forward face is generally normal to the outside surface of the flank portion and the forward face and the outside face define a forward edge.

7. The fertilizer blade assembly of claim 1, wherein;

the fertilizer tube is spaced away from rear surface of the shank member and is removably mounted to the fertilizer blade assembly.

8. The fertilizer blade assembly of claim 1, wherein;

the fertilizer tube is spaced away from rear surface of the shank member and is removably mounted to the fertilizer blade assembly by a bracket adjacent to the proximate end of the shank member and is held at the lower end by a channel feature defined in the point member.

9. A fertilizer blade assembly for injecting fertilizer fluid under the surface of agricultural topsoil, comprising:

(a) an elongated shank member that extends between a proximate end and a distal end, the proximate end adapted for attachment to a bracket piece of a fertilizer implement, the distal end extending downward and to a lesser extent forward from the proximate end, the elongated shank member having a generally constant rectangular cross section extending from the proximate end of the shank member to the distal end of the shank member and presenting a front surface, an opposite back surface and opposite side surfaces extending between the front and back surfaces such that the spacing between the front and back surfaces is substantially greater than the spacing between the side surfaces, the shank member further defining at least one fastener hole, (b) a point member including a forward leading edge portion, a base portion and opposite flank portions which connect between the leading edge portion and the base portion, the leading edge portion, the base portion and the flank portions defining a channel for receiving the shank member, the point member having at least one fastener hole which is positioned to align with the at least one fastener hole in the shank member for receiving at least one fastener for removably fastening the point member to the shank member, (c) the leading edge portion of the point member defined by two opposing generally symmetrically angled cutting surfaces which converge to present a leading edge, the leading edge being generally parallel to the front surface of the shank member at the proximate end of the point member and diverging forward of the front surface of the shank member at the distal end of the point member, (d) each flank portion of the point member having generally flat side surfaces which are generally parallel to the side surfaces of the shank member and which each originate at a forward boundary at one of the opposite cutting surfaces of the edge portion and terminate at a rear boundary which defines a rear perimeter that extends from the proximate end of the point member to the distal end of the point member, (e) each flank portion of the point member also including a pattern of at least two crumbler ridges, each crumbler ridge of each of the patterns of crumbler ridges projecting from the surface of the flank portion, the crumbler ridges generally square in cross section and having height and width dimensions which are generally between 10% and 25% the magnitude of the width of the point member, each crumbler ridge originating at a forward point adjacent to the flank portion's forward boundary and terminating at a rear point which is adjacent to the flank portion's rear boundary, such that the rear point is elevated in relation to the forward point, the crumbler ridges of each pattern of crumbler ridges spaced such that, for a crumbler ridge which is not the bottom crumbler ridge in the pattern, the forward point of the crumbler ridge is located at least as high as the rear point of the crumbler ridge which is located under the crumbler ridge, and, (f) a fertilizer tube mounted behind the shank member and extending to the distal end of the shank member having at least one opening at the distal end thereof for releasing fertilizer fluid, whereby, as the fertilizer knife assembly is drafted through a top layer of soil, the point member splits the soil and then crumbles the soil with the crumbler ridges to produce a furrow that is deeper than it is wide filled with crumbled small clumps of soil, the crumbled soil capturing and retaining a substantial portion of the fertilizer fluid released from the fertilizer tube.

10. The fertilizer blade assembly of claim 9, wherein;

a line passing through the forward point and the rear point of each crumbler ridge and a horizontal line define an attack angle for the crumbler ridge and the crumbler ridges are arranged such that the attack angle for each crumbler ridge in a pattern increases from the lowest crumbler ridge to the highest crumbler ridge.

11. The fertilizer blade assembly of claim 9, wherein;

the fertilizer tube is spaced away from rear surface of the shank member and is removably mounted to the fertilizer blade assembly.

12. The fertilizer blade assembly of claim 9, wherein;

the fertilizer tube is spaced away from rear surface of the shank member and is removably mounted to the fertilizer blade assembly by a bracket adjacent to the proximate end of the shank member and is held at its lower end by a channel feature defined in the point member.

* * * * *